United States Patent
Ma et al.

(10) Patent No.: US 12,256,841 B2
(45) Date of Patent: Mar. 25, 2025

(54) LIFT TABLE WITH INTELLIGENT ADJUSTING FUNCTION AND METHOD FOR INTELLIGENTLY ADJUSTING LIFT TABLE

(71) Applicant: UE FURNITURE CO., LTD., Huzhou (CN)

(72) Inventors: Tao Ma, Huzhou (CN); Xiaoming Wang, Huzhou (CN); Keting Wang, Huzhou (CN); Hongchao Yu, Huzhou (CN); Qiang Li, Huzhou (CN); Pengfei Yu, Huzhou (CN)

(73) Assignee: UE FURNITURE CO., LTD., Huzhou (CN)

( * ) Notice: Subject to any disclaimer, the term of this patent is extended or adjusted under 35 U.S.C. 154(b) by 0 days.

(21) Appl. No.: 17/909,399

(22) PCT Filed: Jul. 6, 2022

(86) PCT No.: PCT/CN2022/104054
§ 371 (c)(1),
(2) Date: Sep. 5, 2022

(87) PCT Pub. No.: WO2023/280193
PCT Pub. Date: Jan. 12, 2023

(65) Prior Publication Data
US 2024/0197071 A1 Jun. 20, 2024

(30) Foreign Application Priority Data
Jul. 6, 2021 (CN) .......................... 202121523955.7

(51) Int. Cl.
*A47B 9/00* (2006.01)
*G05B 15/02* (2006.01)

(52) U.S. Cl.
CPC ................. *A47B 9/00* (2013.01); *G05B 15/02* (2013.01); *A47B 2200/0056* (2013.01)

(58) Field of Classification Search
CPC .............. A47B 9/00; A47B 2200/0056; A47B 2200/0062; G05B 15/02; H02P 6/08
See application file for complete search history.

(56) References Cited

U.S. PATENT DOCUMENTS 4,593,197 A * 6/1986 Miyatake ........... G01N 21/3504
250/338.3
4,950,900 A * 8/1990 Takeuchi ........... G01N 21/3504
250/338.3

(Continued)

FOREIGN PATENT DOCUMENTS

CN 108630034 A * 10/2018 ............. G09B 5/067

*Primary Examiner* — Tung S Lau
(74) *Attorney, Agent, or Firm* — Olive Law Group, PLLC

(57) ABSTRACT

The invention relates to a lift table with an intelligent adjusting function and a method for intelligently adjusting the lift table. The lift table comprises a lift table body and an intelligent adjusting device arranged on the lift table. The intelligent adjusting device comprises an infrared pyroelectric detection unit, an infrared thermopile detection unit and a table-top height adjusting unit. The table-top height adjusting unit comprises a driving unit and a motor unit. The motor unit comprises a motor and a transmission device. The transmission device is connected between the motor and an adjustable table-top of the lift table body. The infrared pyroelectric detection unit and the infrared thermopile detection unit both are connected to the driving unit. The method is realized based on the lift table. The present invention can solve a health problem due to long-time use of the table by a user at a single posture.

10 Claims, 1 Drawing Sheet

(56) References Cited

U.S. PATENT DOCUMENTS

| | | | | |
|---|---|---|---|---|
| 5,281,818 A | * | 1/1994 | Tomita | G01J 5/34 |
| | | | | 250/338.3 |
| 7,255,397 B2 | * | 8/2007 | Olcheski | A61G 5/14 |
| | | | | 297/DIG. 10 |
| 2014/0319349 A1 | * | 10/2014 | Horie | G06F 3/0423 |
| | | | | 250/338.3 |
| 2019/0266879 A1 | * | 8/2019 | Zhu | A61B 5/743 |

* cited by examiner

LIFT TABLE WITH INTELLIGENT ADJUSTING FUNCTION AND METHOD FOR INTELLIGENTLY ADJUSTING LIFT TABLE

CROSS REFERENCE TO RELATED APPLICATIONS

This is a U.S. national stage patent application that claims priority to and the benefit of PCT International Patent Application No. PCT/CN2022/104054, filed on Jul. 6, 2022, which claims priority to and the benefit of Chinese Patent Application No. 2021215239557, filed on Jul. 6, 2021; the disclosures of which are incorporated by reference herein in their entireties.

TECHNICAL FIELD

The present invention particularly relates to a lift table with an intelligent adjusting function and a method for intelligently adjusting the lift table.

BACKGROUND

At present, students and office workers use tables and chairs at fixed postures or incorrect postures for a long time every day, which easily results in physical fatigue, physiological deformation and even diseases. Existing tables and chairs with adjusting functions in the market are manually adjusted subjectively and cannot remind or correct users automatically. If the users are devoted in work or are insensitive to time, they will forget adjusting tables and chairs necessarily.

SUMMARY

Technical Problem

Therefore, in order to effectively avoid a sedentary problem of users in learning and working processes, implementation of insensitive intelligent adjustment is the technical problem demanding prompt solution in the field.

Technical Solution

In order to solve the above-mentioned problem, the present invention provides a lift table with an intelligent adjusting function and a method for intelligently adjusting the lift table, which can solve a health problem as a result of long-time use of the lift table by a user at a single posture.

The technical solution of the present invention is as follows:

A lift table with an intelligent adjusting function includes a lift table body and an intelligent adjusting device arranged on the lift table, where the intelligent adjusting device includes an infrared pyroelectric detection unit, an infrared thermopile detection unit and a table-top height adjusting unit; the table-top height adjusting unit includes a driving unit and a motor unit; the motor unit includes a motor and a transmission device; the transmission device is connected between the motor and an adjustable table-top of the lift table body; and the infrared pyroelectric detection unit and the infrared thermopile detection unit both are connected to the driving unit.

Preferably, the infrared pyroelectric detection unit is an infrared pyroelectric sensor.

Preferably, the infrared thermopile detection unit is an infrared thermopile sensor.

Preferably, the transmission device is a drive gear box.

Preferably, the driving unit includes a PID control unit, a PWM generator, an H bridge driver and a Hall signal capture unit; the Hall signal capture unit is electrically connected to the PID control unit, the PID control unit is further electrically connected to the PWM generator, and the PWM generator is electrically connected to the H bridge driver.

Preferably, the motor unit further includes a Hall sensor; a motor winding is connected to the H bridge driver, and the Hall sensor is connected to the Hall signal capture unit.

Preferably, the intelligent adjusting device further includes a table-top height detection unit and an intelligent judging unit; the table-top height detection unit is configured to detect a current height of the lift table, and the intelligent judging unit is configured to judge whether a user is in a posture state for a long time; and the table-top height adjusting unit is configured to adjust the lift table from the current height to a target height according to height information.

A method for intelligently adjusting a lift table is realized by the lift table with an intelligent adjusting function. The method includes:

S01, judging, by the intelligent judging unit, that a current user is in a posture state when the intelligent judging unit judges that the current table-top height detected by the table-top height detection unit is in a posture height range predetermined by the user and an electric signal detected by the infrared pyroelectric detection unit and/or the infrared thermopile detection unit meets a condition that the user moves in an appointed position; and S02, performing, by the intelligent judging unit, timing on the current user in the posture state, and judging that the user is in a sedentary state and triggering the table-top height adjusting unit to work when a current posture duration reaches a first predetermined numerical value.

Preferably, there are various conditions where the intelligent judging unit judges that the user moves in the appointed position in S01, and when any condition occurs, the condition that the user moves in the appointed position is met:

when the electric signal detected by the infrared pyroelectric detection unit or the infrared thermopile detection unit turns from a high level to a low level in a set time interval, judging, by the intelligent judging unit that the user enters the appointed position;

when it is judged that the user enters the appointed position, continuously detecting, by the infrared pyroelectric detection unit, that the user moves, and judging, by the intelligent judging unit, that the user is maintained at the appointed position;

when it is judged that the user enters the appointed position, continuously outputting, by the infrared thermopile detection unit, the low level, and judging, by the intelligent judging unit, that the user is maintained at the appointed position; and when the infrared pyroelectric detection unit continuously detects that the user moves, and the infrared thermopile detection unit continuously outputs low level, judging, by the intelligent judging unit that the user is maintained at the appointed position.

Preferably, a process where the table-top height adjusting unit is triggered to perform imperceptible intelligent adjustment in S02 further includes:

controlling, by the driving unit, soft start of the motor, and controlling the motor to operate at a constant ultra-low speed after the motor enters the running state, so as to realize imperceptible intelligent adjustment of the height of the lift table till the height reaches a standing posture height predetermined by the user.

Preferably, a process where the table-top height adjusting unit is triggered to perform imperceptible intelligent adjustment in S02 further includes:

during the imperceptible intelligent adjustment, when it is detected that no user moves at the appointed position, stopping, by the intelligent judging unit, timing of the posture state and performing zero clearing so as to further time a leaving state of the user; and when the leaving state of the user reaches a second predetermined numerical value, triggering, by the intelligent judging unit, the table-top height adjusting unit to restore the table-top to a predetermined sitting posture height.

Beneficial Effects the present invention has the technical effects that the lift able provided by this application detects whether the user is in the sitting posture state for a long time in the process that the user uses the lift table. If yes, current height of the lift table is intelligently adjusted in an imperceptible manner of the user, so that the sitting posture of the user is improved automatically.

DETAILED DESCRIPTION OF EMBODIMENTS

Detailed description of the embodiments of the present invention will be made below in combination with the accompanying drawings of the description.

Figure 1:
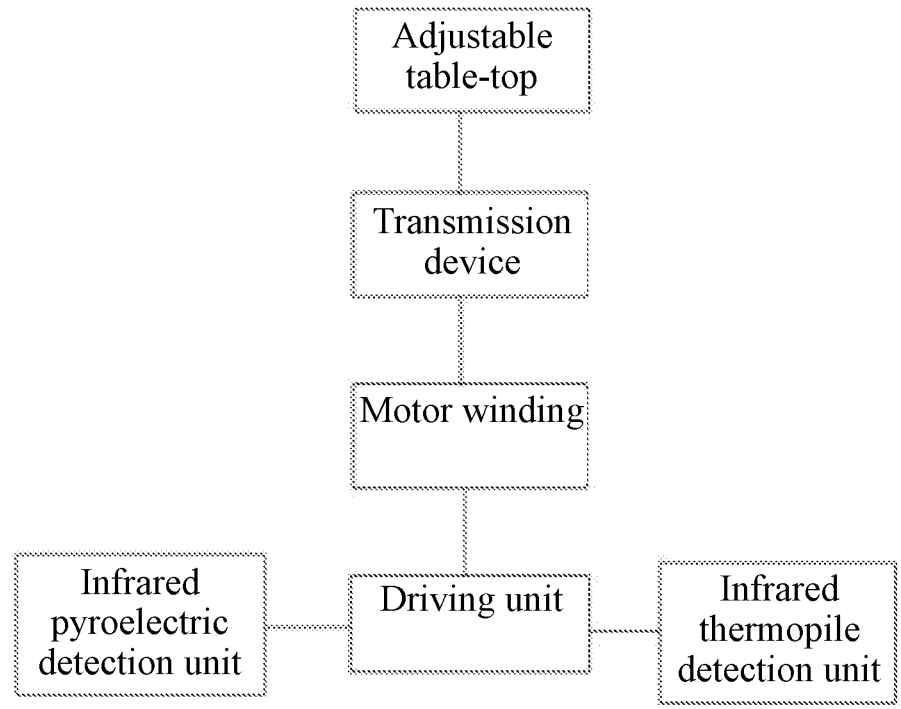
FIG. 1 is a structure composition diagram of an intelligent adjusting device of the present invention.

As shown in FIG. 1, a lift table with an intelligent adjusting function is provided with an intelligent adjusting device, where the intelligent adjusting device includes an infrared pyroelectric detection unit for detecting whether a user moves in an appointed position of the lift table, an infrared thermopile detection unit for detecting whether there is the user in the appointed position of the lift table and there is the user continuously, and a table-top height adjusting unit that adjusts the lift table from the current height to a target height; the table-top height adjusting unit includes a driving unit and a motor unit; the motor unit includes a motor and a transmission device; the transmission device is connected between the motor and an adjustable table-top of the lift table body; and the infrared pyroelectric detection unit and the infrared thermopile detection unit both are connected to the driving unit.

The intelligent adjusting device further includes a table-top height detection unit formed by software programs arranged in the driving unit and an upper computer matched by a hardware for detecting the current height of the lift table, an intelligent judging unit for judging whether the user is in a sitting posture state for a long time, a table-top height adjusting unit for adjusting the lift table from the current height to the target height according to the height information, a table-top height set parameter unit for a client to preset a sitting posture range and a standing posture range, and a table-top height manual setting unit for the client to subjectively adjust the height.

The above-mentioned software programs all are known programs in the prior art, which are not defined and protected in the embodiment.

As an implementation mode of the present invention, the infrared pyroelectric detection unit is an infrared pyroelectric sensor, the infrared thermopile detection unit is an infrared thermopile sensor, and the transmission device is a drive gear box.

Figure 2:
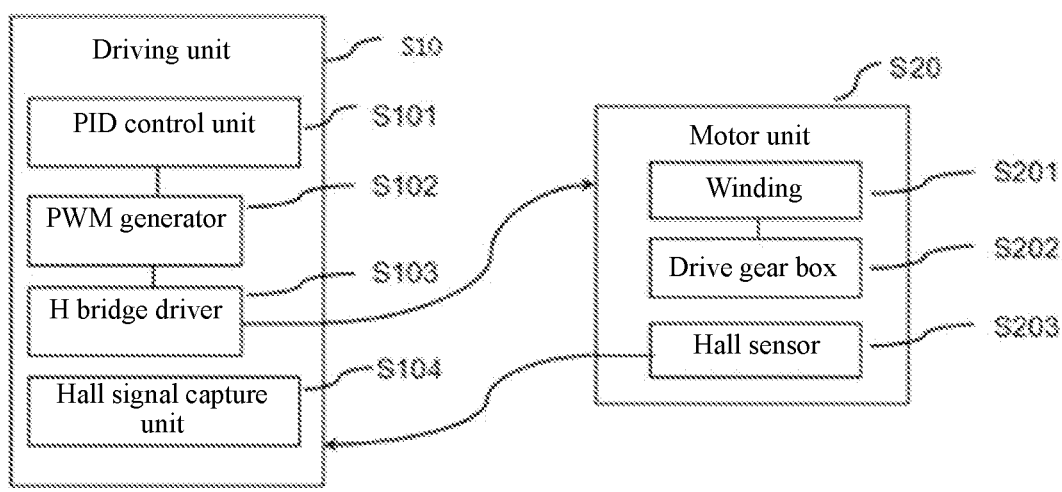
FIG. 2 is a structure composition diagram of a table-top height adjusting device of the present invention.

As an implementation mode of the present invention, as shown in FIG. 2, the table-top height adjusting unit includes a driving unit and a motor unit. The driving unit S10 includes a PID control unit S101, a PWM generator S102, an H bridge driver S103 and a Hall signal capture unit S104, where the Hall signal capture unit is electrically connected to the PID control unit S101, the PID control unit S101 is electrically connected to the PWM generator S102, and the PWM generator S102 is electrically connected to the H bridge driver S103; the motor unit S20 includes a motor winding S201, a drive gear box S202 and a Hall sensor S203, where the motor winding S201 is connected to the H bridge driver S103, and the Hall sensor S203 is electrically connected to the Hall signal capture unit S104.

The drive gear box S202 can be driven in form of single motor, double motor or multiple motors, and the quantity of the motors can be set according to actual conditions, which is not defined in the embodiment.

The PID control unit S101 is used for controlling a duty cycle of the PWM generator S102 according to rotating speed information collected by the Hall signal capture unit S104, the PWM generator S102 is used for generating PWM so as to realize an adjustable voltage, the H bridge driver S103 is used for applying positive and negative voltages to the winding S201 so as to realize a forward and backward rotating function, and the Hall signal capture unit S104 is used for collecting rotating speed information.

A working process of the present invention can be as follows:

1. The intelligent adjusting device is initialized;
2. Whether there is the user who moves in the appointed position of the lift table by using the infrared pyroelectric detection unit, and whether there is the user persistently in the appointed position of the lift table by using the infrared thermopile detection unit;
3. The current table-top height is detected by using the table-top height detection unit, so as to judge whether the user is in a sitting posture;
4. When it is detected that the height of the lift table is in the user sitting posture range and there is the user who moves in the appointed position, whether the user is in the sitting posture state for a long time is judged real time;
5. If the user is in the sitting posture state for a long time, the height of the table-top is intelligently adjusted imperceptibly to remind and correct the moving posture of the user or switch the postures.

Judging the movement of the user in S2 is specifically described as follows:

If electric signals of pyroelectricity and infrared thermopile change randomly within a specified interval time, it is judged that the state of the user at the moment changes;

If a high level is turned to a low level in the set time interval, it is judged that the user enters the appointed position;

If the low level is turned to the high level in the set time interval, it is judged that the user leaves the appointed position;

Under circumstances that it is detected by pyroelectricity that there is the user who moves, and it has been judged that the user enters the appointed, it is judged that the user is maintained in the appointed position;

Under circumstances that the infrared thermopile continuously outputs the low level, and it has been judged that the user enters the appointed, it is judged that the user is maintained in the appointed position;

If the above-mentioned movement of the user and outputting of the low level continuously by the infrared thermopile are detected at the same time, it is judged that the user is maintained in the appointed position regardless of whether it is judged that the user enters previously;

When movement of the user cannot be detected continuously by pyroelectricity and the infrared thermopile continuously outputs the high level, it is judged that the user leaves the appointed position.

Judging the sitting posture of the user in S3 is specifically described as follows:

When the height of the table-top is in the sitting posture height range predetermined by the user, and there is the user who moves in the appointed position, it is judged that the current user is in the sitting posture; when the height of the table-top is not in the sitting posture range, an imperceptible intelligent adjusting function logic will not be activated.

The imperceptible intelligent adjusting function logic includes:

imperceptible intelligent adjustment is adjustment of the height of the table-top under a circumstance that user's attention is not drawn;

an adjusting mode is that micro-motion of the table-top is realized by controlling soft start of the motor and operation at an ultra-low uniform speed;

the adjusted height every time is controlled within 2 cm;

the adjusting time interval is predetermined (1-3 min default in the embodiment);

soft start: the input voltage of the motor is adjusted by PWM, so that the motor is turned to running state from static state, and in the process, vibration or jitter is not generated;

ultra low speed operation is kept: after the motor enters the running state, the motor is kept to run at the ultra low uniform speed by setting reasonable PWM;

motor rotating speed detection is acquired by feedback of a Hall apparatus, and forms closed loop control to the motor together with PWM.

The process of judging whether the user is in the sitting posture state for a long time in S4 includes:

when it is detected that the height of the lift table is in the user sitting posture range and there is the user who moves in the appointed position, timing is started to obtain a sitting posture duration of the use in the appointed position;

after the sitting posture duration reaches the preset numerical value, it is judged that the user is in the sitting posture state for a long time, namely, the user is in a sedentary state.

When it is judged that the user is in the sedentary state, the height of the lift table is intelligently adjusted imperceptibly according to the predetermined speed till the sitting posture height predetermined by the user is reached; after timing is started, detection information changes, and it is judged whether the sitting posture duration timing this time is finished according to new information; in the timing process, when it is detected that there is no user who moves in the appointed position, it is judged that the user leaves the appointed position, sitting posture timing is stopped and zeroed, and leaving time timing of the user is started; when the leaving time timing of the user reaches the predetermined numerical value, the table-top restores to the predetermined sitting posture height automatically.

Whether imperceptible intelligent intervention function of the intelligent adjusting device is started can be manually started or closed.

The specific process of adjusting the height of the table-top through regulation of the driving unit S10 and the motor unit S20 is as follows:

1. After the system receives an operating instruction, an ultra low target speed Speed_Target is set and converted into a table-top lift speed of 1 mm/s, the Hall signal capture unit S104 is enable to convert an output signal of the Hall sensor S203 to obtain an actual running rotating speed Speed_Run and position information;
2. Then an upper bridge arm of the H bridge driver S103 is conducted, another bridge arm is controlled by the PWM generator S102: the driving unit set the starting duty cycle Duty_Start stored previously to the PWM generator S102;
3. In the starting stage, the table-top runs slowly: equivalent voltages previously applied to two ends of the motor winding S201 are insufficient to run the motor, the PWM generator S102 controls the H bridge driver S103 at a rate of increasing 0.2% duty cycle per 50 millisecond, so that voltages at two ends of the winding S201 are increased. When it is increased continuously till there are changes on rotating speed and position signal, the driving unit S10 enters a constant rotating speed running PID control stage;
4. The constant rotating speed running PID control stage: as shown in formula and block diagram below, difference between the running rotating speed Speed_Run and the target rotating speed Speed_Target is made to obtain e(k), the PID controller unit S101 adjusts the duty cycle of the PWM generator S102 according to the rotating speed difference, so that the motor runs at a low constant rotating speed, and further, the table-top lifts at a speed of 1 mm/s.

$$PWM\_Duty = Kp*e(k) + Ki*\Sigma e(k) + Kd[e(k) - e(k-1)]$$

5. Integral averaging is made on duty cycle of PWM during constant rotating speed running, and it is multiplied by 0.7 as an initial duty cycle of next start;
6. When the table-top lifts 5 mm, the table-top is decreased in speed and stopped: the driving unit S10 controls the duty cycle of PWM at a rate of decreasing 0.5% per 50 milliseconds. When the duty cycle is decreased to Duty_Start, PWM output is cut off, the motor stops and the table-top stops lifting;
7. After it is stopped to wait for 60 s, it enters a next "start-run-stop" cycle, and S1 to S6 are repeated till the height predetermined by the user is met.

Finally, it should be noted that the above-mentioned embodiments are merely specific implementation modes of the present invention and are used to explain the technical solution of the present invention and shall not be construed as limitation. The scope of protection of the present invention is not limited herein. Despite reference to the aforementioned embodiments to make a detailed description for the present invention, it will be understood by those of ordinary skill in the art that those skilled in the art still can modify the technical solution recorded by the aforementioned embodiments or can come up with changes easily or make equivalent substitutions on part of technical features therein within the technical scope uncovered by the present invention. Such modifications, changes or substitutions do not deviate the nature of the technical solution from the spirit and scope of the technical solution embodied in the embodiments according to the present invention. They shall be covered within the scope of protection of the present invention. Therefore, the scope of protection of the present invention shall be subject to the scope of protection of the claims.

The invention claimed is:

1. A lift table, comprising a lift table body and an intelligent adjusting device arranged on the lift table, wherein the intelligent adjusting device comprises an infrared pyroelectric detection unit, an infrared thermopile detection unit, a table-top height adjusting unit, a table-top height detection unit and an intelligent judging unit; the table-top height adjusting unit comprises a driving unit and a motor unit; the motor unit comprises a motor winding and a transmission device; the transmission device is connected between the motor and an adjustable table-top of the lift table body; and the infrared pyroelectric detection unit and the infrared thermopile detection unit both are connected to the driving unit; the infrared pyroelectric detection unit is configured to detect whether a user moves in an appointed position of the lift table; the infrared thermopile detection unit is configured to detect whether there is the user in the appointed position of the lift table and there is the user continuously; the table-top height detection unit is configured to detect a current height of the lift table; the intelligent judging unit is configured to judge whether a user is in a posture state for a long time according to the detection result of the infrared pyroelectric detection unit, the infrared thermopile detection unit and the table-top height detection unit; and the table-top height adjusting unit is configured to adjust the lift table from the current height to a target height according to height information in response to that a user is in a posture state for a long time judged by the intelligent judging unit.

2. The lift table according to claim 1, wherein the infrared pyroelectric detection unit is an infrared pyroelectric sensor.

3. The lift table according to claim 1, wherein the infrared thermopile detection unit is an infrared thermopile sensor.

4. The lift table according to claim 1, wherein the transmission device is a drive gear box.

5. The lift table according to claim 1, wherein the driving unit comprises a PID control unit, a PWM generator, an H bridge driver and a Hall signal capture unit; the Hall signal capture unit is electrically connected to the PID control unit, the PID control unit is further electrically connected to the PWM generator, and the PWM generator is electrically connected to the H bridge driver.

6. The lift table according to claim 5, wherein the motor unit further comprises a Hall sensor, the motor winding is connected to the H bridge driver, and the Hall sensor is connected to the Hall signal capture unit.

7. A method for intelligently adjusting a lift table, the method comprising:

S01, providing the lift table comprising a lift table body and an intelligent adjusting device arranged on the lift table, wherein the intelligent adjusting device comprises an infrared pyroelectric detection unit, an infrared thermopile detection unit, a table-top height adjusting unit, a table-top height detection unit and an intelligent judging unit; the table-top height adjusting unit comprises a driving unit and a motor unit; the motor unit comprises a motor winding and a transmission device; the transmission device is connected between the motor and an adjustable table-top of the lift table body; and the infrared pyroelectric detection unit and the infrared thermopile detection unit both are connected to the driving unit; the infrared pyroelectric detection unit is configured to detect whether a user moves in an appointed position of the lift table; the infrared thermopile detection unit is configured to detect whether there is the user in the appointed position of the lift table and there is the user continuously; the table-top height detection unit is configured to detect a current height of the lift table; the intelligent judging unit is configured to judge whether a user is in a posture state for a long time according to the detection result of the infrared pyroelectric detection unit, the infrared thermopile detection unit and the table-top height detection unit; and the table-top height adjusting unit is configured to adjust the lift table from the current height to a target height according to height information in response to that a user is in a posture state for a long time judged by the intelligent judging unit;

S02, judging, by the intelligent judging unit, that a current user is in a posture state when the intelligent judging unit judges that the current table-top height detected by the table-top height detection unit is in a posture height range predetermined by the user and an electric signal detected by the infrared pyroelectric detection unit and/or the infrared thermopile detection unit meets a condition that the user moves in an appointed position; and S03, performing, by the intelligent judging unit, timing on the current user in the posture state, and judging that the user is in a sedentary state and triggering the table-top height adjusting unit to work when a current posture duration reaches a first predetermined numerical value.

8. The method for intelligently adjusting a lift table according to claim 7, wherein there are various conditions where the intelligent judging unit judges that the user moves in the appointed position in S01, and when any of the conditions occurs, the condition that the user moves in the appointed position is met:

when the electric signal detected by the infrared pyroelectric detection unit or the infrared thermopile detection unit turns from a high level to a low level in a set time interval, judging, by the intelligent judging unit that the user enters the appointed position;

when it is judged that the user enters the appointed position, continuously detecting, by the infrared pyroelectric detection unit, that the user moves, and judging, by the intelligent judging unit, that the user is maintained at the appointed position;

when it is judged that the user enters the appointed position, continuously outputting, by the infrared thermopile detection unit, the low level, and judging, by the intelligent judging unit, that the user is maintained at the appointed position; and when the infrared pyroelectric detection unit continuously detects that the user moves, and the infrared thermopile detection unit continuously outputs low level, judging, by the intelligent judging unit that the user is maintained at the appointed position.

9. The method for intelligently adjusting a lift table according to claim 7, wherein a process where the table-top height adjusting unit is triggered to perform imperceptible intelligent adjustment in S02 comprises:

controlling, by the driving unit, soft start of the motor, and controlling the motor to operate at a constant ultra-low speed after the motor enters the running state, so as to realize imperceptible intelligent adjustment of the height of the lift table till the height reaches a standing posture height predetermined by the user.

10. The method for intelligently adjusting a lift table according to claim 9, wherein a process where the table-top height adjusting unit is triggered to perform imperceptible intelligent adjustment in S02 further comprises:

during the imperceptible intelligent adjustment, when it is detected that no user moves at the appointed position, stopping, by the intelligent judging unit, timing of the posture state and performing zero clearing so as to further time a leaving state of the user; and when the leaving state of the user reaches a second predetermined numerical value, triggering, by the intelligent judging unit, the table-top height adjusting unit to restore the table-top to a predetermined sitting posture height.

\* \* \* \* \*